United States Patent [19]
Kulp et al.

[11] Patent Number: 6,114,488
[45] Date of Patent: Sep. 5, 2000

[54] POLYURETHANEUREA ELASTOMERS FOR DYNAMIC APPLICATIONS

[75] Inventors: Mary Joanne Kulp, Macungie; Edwin Lee McInnis, Lincoln University, both of Pa.

[73] Assignee: Air Products and Chemicals, Inc., Allentown, Pa.

[21] Appl. No.: 09/260,293

[22] Filed: Mar. 2, 1999

[51] Int. Cl.[7] .................................................. C08G 18/10
[52] U.S. Cl. ........................ 528/49; 528/64; 252/182.23
[58] Field of Search ................... 528/64, 49; 252/182.23

[56] References Cited

U.S. PATENT DOCUMENTS

| | | | |
|---|---|---|---|
| 3,897,396 | 7/1975 | Ishii et al. | 528/64 |
| 4,089,822 | 5/1978 | Vial | 528/64 |
| 5,039,775 | 8/1991 | Oyaizu | 528/68 |
| 5,086,153 | 2/1992 | Oyaizu | 528/68 |
| 5,183,877 | 2/1993 | Swanson | 528/64 |
| 5,548,056 | 8/1996 | Chung | 528/61 |

FOREIGN PATENT DOCUMENTS

WO 9413722  6/1994  WIPO.

OTHER PUBLICATIONS

Saunders and Frisch; Polyurethanes; 1962; pp. 176, 177.
Luvocure Polyurethan–Vernetzer—Lehmann & Voss Co., Aug., 1997.

Primary Examiner—Rachel Gorr
Attorney, Agent, or Firm—Michael Leach

[57] ABSTRACT

A method for the rotational casting of a polyurethane elastomer onto a rotating substrate which comprises mixing a polyurethane prepolymer, an amine curative and optionally a polyol in a mixing head and depositing the mixture onto the rotating substrate, the amine curative comprising:

(a) 2–45 wt % aminobenzoate polyol having molecular weight of 200–3,000,
(b) 55–98 wt % aromatic polyamine, and
(c) 0 to <5 parts by wt carboxylic acid catalyst per hundred parts (a) and (b), the amine curative being at a temperature sufficient to melt the amines when mixed with the polyurethane prepolymer.

23 Claims, No Drawings

POLYURETHANEUREA ELASTOMERS FOR DYNAMIC APPLICATIONS

FIELD OF THE INVENTION

The present invention relates to the preparation of polyurethaneurea elastomers, especially those prepared by rotational casting.

BACKGROUND OF THE INVENTION

Polyurethaneurea roll covers have traditionally been manufactured by mixing and pouring reactive chemical components into a mold containing a metal core. This procedure presents problems when large rolls and/or very reactive polymer systems are employed. To address this difficulty, reactive systems have been developed which gel rapidly when cast onto a rotating roll core. Layers of material are built up to produce coatings of the desired thickness which can be used as rolls or wheels. However, these "rotational cast" systems exhibit two major deficiencies: (1) adhesion of the rotational cast polyurethaneurea to the metal core is often poor, and (2) the dynamic performance of the elastomeric roll cover is poor in that, under conditions of high load and speed, the materials undergo hysteretic heating and melt or "blow-out". This shortcoming is particularly acute for very hard roll covers used in such areas as paper manufacturing.

Commercial systems based upon polyurethane resins containing diphenyl-methanediisocyanate (MDI) have been developed for rotational casting. These resins are typically cured with a curative blend containing one or more aromatic polyamines and a long chain polyol.

U.S. Pat. No. 5,039,775 discloses a process for producing polyurea resin in which an aromatic polyamine, a specific aminobenzoate derivative and polyisocyanate are reacted.

U.S. Pat. No. 5,183,877 discloses a two-part adhesive composition utilizing a polyurea or polyurethane/urea prepolymer for improved adhesion to plastics and metals and particularly to elastomers. The two-component adhesive formulation of the invention comprises a mixture of polyamines, specifically an aminobenzoate terminated polytetramethylene glycol (AB-PTMEG) and an aromatic diamine, with an isocyanate terminated polyurea prepolymer formed by reacting the AB-PTMEG with a diisocyanate.

U.S. Pat. No. 5,548,056 discloses a laminated, untreated fiberglass reinforced polyester substrate and a cured polyureaurethane adhesive composition. The prepolymer component of the adhesive is a reaction product of a slowly reacting polyisocyanate and a polyol. The curative component comprises a diamine and, optionally, a polyol. Example 12 shows the use of a polymeric aromatic diamine of about 870 molecular weight (Polamine 650 curative) in combination with dialkylated diaminobenzene (Unilink 4100 diamine), dimethylthiotoluenediamine (Ethacure 300 diamine), and 2-methyl-1,5-pentanediamine (Dytek-A diamine).

WO 94/13722 discloses polyurethane prepolymers prepared with mononuclear aromatic diisocyanate such as toluenediisocyanate (TDI) and an aliphatic diisocyanate such as H12MDI. These prepolymers can be cured with 4,4'-methylene-bis-(3-chloro-2,6-diethylaniline) (MCDEA) to form a cured urethane elastomer. Also disclosed are prepolymers made from TDI and cured with a blend of two aromatic diamine curatives, particularly MCDEA and 4,4'-methylene-bis-(2-chloroaniline) (MBOCA). "Luvocure Polyurethan-Vernetzer" brochure from Lehmann & Voss & Co. teaches the reaction of Luvocure MUT/HT curative with TDI-polyether prepolymers. Luvocure MUT/HT curative has been analyzed as comprising a blend of MCDEA and Polamine 1000 curative, a diaminobenzoate polyether.

SUMMARY OF THE INVENTION

The present invention is directed to a method for casting a polyurethaneurea elastomer, especially the rotational casting onto a rotating substrate (roller core), which comprises mixing a polyurethane prepolymer, preferably a TDI-based prepolymer, an amine curative, and optionally a polyol in a mixing head, and depositing the mixture in a casting mold or onto the rotating substrate. According to the present invention, the amine curative for use in the rotational casting method comprises:

(a) 2 to 45 wt % aminobenzoate functionalized polyol, (b) 55 to 98 wt % aromatic polyamine, and (c) 0 to <5 parts by wt carboxylic acid catalyst per hundred parts by wt (a) and (b), the amine curative at a temperature sufficient to melt the amines when it is mixed with the prepolymer.

As another embodiment of the invention there is provided an amine curative composition for use in conventional, or vertical, elastomer casting method comprising (a) 2 to 45 wt % aminobenzoate functionalized polyol, (b) 55 to 98 wt % aromatic polyamine, and (c) 0.01<5 parts by wt carboxylic acid catalyst per hundred parts by wt (a) and (b).

Advantageously, the method produces cast elastomers with a unique combination of properties of good hardness, i.e., at least 50 Shore D, high elongation of at least 200% and good dynamic performance and improved hydrolytic, high temperature stability.

In addition, the reactivity of the amine curative makes the method especially suited for rotational casting of elastomers having good static and dynamic physical properties necessary for demanding, high-speed and/or high-load applications, such as rollers and wheels, and with good adhesion of the elastomer to the metal core.

DETAILED DESCRIPTION OF THE INVENTION

In standard casting of elastomers, such as vertical casting, the liquid reactants for making the elastomer are pumped through a meter mix casting machine to a mixhead that deposits the mixed reactants in a casting mold. In the rotational casting process, the liquid reactants are pumped through a meter mix casting machine to a traversing mixhead that deposits the mixed material onto a rotating substrate. The number of mix head passes will depend upon the required thickness of the elastomer product. The applied elastomer reactants may achieve final cure by subsequent heating or, if the reactants are sufficiently reactive, may be cured at room temperature.

The polyurethane prepolymer used in making the elastomers according to the invention are those prepolymers typically used and well known in the art and comprise a prereacted mixture of a polyisocyanate and a polyether or polyester polyol, or a polyol that has a basic backbone obtained by polymerization of such monomers as butadiene and/or isoprene. Many organic polyisocyanates may be used in making the prepolymers such as, for example, p-phenylene diisocyanate (PPDI), toluenediisocyanates (TDI), 4,4'-diphenyl-methanediisocyanate (MDI), isophoronediisocyanate (IPDI), hexamethylenediisocyanate (HDI), trimethylhexamethylenediisocyanate (TMDI) and a mixture of the three geometric isomers of 1,1'-methylene-bis(4-isocyanatocyclohexane), abbreviated collectively as H12MDI. It is preferred that the prepolymers are made with TDI.

A list of suitable polyols for use in making the prepolymers are the polyalkylene polyether and polyester polyols. The polyalkylene polyether polyols include the poly (alkylene oxide) polymers, such as poly(ethylene oxide), poly(propylene oxide) and poly(butylene oxide) as well as polymers and copolymers of ethylene oxide and/or propylene oxide with terminal hydroxyl groups derived from a polyhydric compound including diols and triols; for example, among others, ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, and like low molecular weights.

Obviously, a single high molecular weight polyether polyol may be used. Also, mixtures of high molecular weight polyether polyols such as mixtures of di- and tri-functional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to or in place of some of the polyols, polyamines, such as ethylenediamine, may be used in making the prepolymer.

The isocyanate-terminated prepolymers may be prepared by reacting >1.5 equivalents of a polyisocyanate per equivalent of polyol. The prepolymers may have an active NCO content of 1 to 30 wt %, preferably 3 to 16 wt %. It is preferred that the reaction of the polyisocyanate with the polyol be carried out at a ratio of >2:1 equivalents of polyisocyanate to equivalents of polyols and most preferably at a 3–12:1 equivalents ratio. Excess unreacted polyisocyanate monomer can be removed from the prepolymer by processes well known in the art so that the unreacted polyisocyanate content is less than 1 wt % and preferably less than 0.25 wt %.

The preferred polyisocyanate prepolymers are those marketed by Air Products and Chemicals, Inc. under the trademarks AIRTHANE® and VERSATHANE®.

The polyurethane prepolymer is reacted with the amine curative composition at an equivalent ratio of 0.8–1.2:1 to yield a high molecular weight polyurethaneurea elastomer. The components are reacted as is typically done in the rotational casting art, e.g., the amine curative and the prepolymer are mixed together and, if desired, heated to promote reaction and cure. Such temperature will commonly be within the range of about ambient to about 150° C.; a more preferred range being from about 80° C. to about 140° C. The reaction is advantageously performed in a moisture-free atmosphere.

The aminobenzoate terminated polyether or polyester polyol component of the amine curative includes polypropylene glycol (PPG) or polyethylene glycol (PEG), or other hydroxyl-terminated polymers that are functionalized with aminobenzoate groups as described in U.S. Pat. Nos. 3,926,932; 3,932,360 and 4,328,322, all of which disclosures are incorporated by reference.

The preferred polyamine is an aminobenzoate terminated polytetramethylene glycol (AB-PTMEG) as shown below.

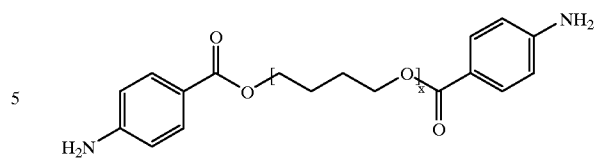

where X may range from 3 to 50.

In the above formula the preferred value for X is such that polymers are based on PTMEGs of number average molecular weight (Mn) 250, 650, 1000, 2000 and 2900. The number of the AB-PTMEG polymer designates the molecular weight of the PTMEG used in its manufacture. For example, AB-PTMEG-1000 refers to an aminobenzoate-terminated 1000 molecular weight polytetramethylene glycol.

The aminobenzoate functionalized polyols should have a total functionality of at least 1.9, preferably 2 or more, and a number average molecular weight (Mn) of 200 to 3,000. The reaction product from making the aminobenzoate functionalized polyols often contains unreacted hydroxyl groups, i.e., materials having hydroxyl and aminobenzoate functionality. It is therefore preferred that such reaction products, i.e., aminobenzoate functionalized polyols, for purposes of this invention comprise at least 70 mole %, preferably at least 80 mole % of completely aminobenzoate functionalized polyols.

The aromatic polyamine component of the curative includes methylenedianiline (MDA); 4,4'-methylene-bis-(3-chloro-2,6-diethylaniline) (MCDEA); diethyltoluenediamine (DETDA); 4,4'-methylene-bis-(2-ethyl-6-methylaniline) (NMMEA); 4,4'-methylene-bis-(2,6-diethylaniline) (MDEA); 4,4'-methylene-bis-(2-isopropyl-6-methylaniline) (MMIPA); 4,4'-bis(sec-butylamino)diphenylmethane; phenylenediamine; methylene-bis-ortho-chloroaniline (MBOCA); 4,4'-methylene-bis-(2-methylaniline) (MMA); 4,4'-methylene-bis-(2-chloro-6-ethylaniline) (MCEA); 1,2-bis(2-aminophenylthiol)ethane; N,N'-dialkyl-p-phenylenediamine; 4,4'-methylene-bis(2,6-diisopropylaniline) (MDIPA); and dimethylthiotoluenediamine (DMTDA) and mixtures of two or more these aromatic polyamines. The preferred aromatic polyamines are MCDEA, MBOCA, DETDA and DMTDA, especially, MCDEA.

The curative composition should comprise about 55–98 wt %, preferably 55–80 wt %, aromatic polyamine and about 2–45 wt %, preferably 20–45 wt %, aminobenzoate-functionalized polyol.

The curative composition may also contain as a catalyst an organic carboxylic acid, especially one of 4 to 20 carbon atoms, preferably 6 to 12 carbons. Suitable carboxylic acid catalysts include azelaic acid, ethylhexanoic acid, and decane dioic acid. The carboxylic acids when used are present at 0.01 to less than 5 parts by wt per hundred parts total amine curatives. It is preferred for rotational casting to use 0.5 to 3 parts by wt carboxylic acid per 100 parts amine curatives and for vertical casting to use 0.05 to 1 parts by wt carboxylic acid per 100 parts amine curatives.

The curative composition can be used either as a preblended mixture, or the individual components can be combined at the point of use in a casting machine. The temperature of the curative composition must be high enough to thoroughly melt both polyamine components. Such temperature may range from 60 to 150° C., especially 85 to 130° C.

The curative composition can be used to produce elastomers with good static and dynamic physical properties necessary for demanding, high-speed and/or high-load applications. The potlife can be controlled as desired by manipulating the ratio of aromatic polyamine to aminobenzoate polyamine along with the catalyst level. The composition cures the polyurethane prepolymer to a solid elastomer with good adhesion to various substrates. The polyurethaneurea elastomers produced according to the invention manifest Shore D hardness of $\geq 50$, preferably $\geq 65$, most preferably $\geq 75$ and elongation $\geq 200\%$, preferably $\geq 225\%$.

Versalink P-250 curative—diaminobenzoate derivative of 250 Mn polyether
Versalink P-650 curative—diaminobenzoate derivative of 650 Mn polyether
Versalink P-1 000 curative—diaminobenzoate derivative of 1000 Mn polyether
Dabco 33LV—triethylenediamine 33 wt % in dipropylene glycol.

TABLE 1

| ELASTOMER | 1 | 2 | 3 | 4 | 5 | 6 | 7 | 8 |
|---|---|---|---|---|---|---|---|---|
| Prepolymer (g) | | | | | | | | |
| Versathane 2175 | 100 | | | | | | | |
| Versathane 2180 | | 100 | | | | | | |
| Airthane XCR-02DEV | | | 100 | 100 | 100 | 100 | 100 | 100 |
| Amine Curative (g) | | | | | | | | |
| MBOCA | 27.2 | 29.0 | 32.0 | | | | | |
| MCDEA | | | | 45.5 | 41.0 | 41.0 | 31.9 | 31.9 |
| Versalink P-250 | | | | | | | 8.2 | 8.2 |
| Versalink P-650 | | | | | | | 15.3 | 15.3 |
| Versalink P-1000 | | | | | 14.0 | 14.0 | | |
| Low Mol. Wt. Aromatic (wt %) | 100 | 100 | 100 | 100 | 74.5 | 74.5 | 57.6 | 57.6 |
| Aminobenzoate (wt %) | | | | | 25.5 | 25.5 | 42.4 | 42.4 |
| Carboxylic Acid (pph* curative) | | | | | | | | |
| 2-Ethylhexanoic Acid | | | | | | 0.97 | 1.1 | |
| Dabco 33LV | | | | | | | | 1.1 |
| Processing Temperatures (° C.) | | | | | | | | |
| Prepolymer | 75 | 75 | 50 | 50 | 50 | 50 | 50 | 50 |
| Curative | 120 | 120 | 120 | 110 | 100 | 100 | 100 | 100 |
| Cure | 100 | 100 | 100 | 130 | 130 | 130 | 130 | 130 |
| Physical Properties | | | | | | | | |
| Hardness (Shore D) | 76 | 81 | 80 | 82 | 78 | 78 | 75 | 73 |
| Rebound (%) | 50 | 40 | 66 | 67 | 69 | 67 | 68 | 64 |
| Elongation (%) | 170 | 190 | 179 | 180 | 279 | 285 | 260 | 320 |
| Humid Aging Properties | | | | | | | | |
| Elongation, 1 day (%) | | | | | | | 259 | 56 |
| Elongation, 7 days (%) | | | | | | | 305 | 62 |
| Elongation, 14 days (%) | | | | | | | 307 | 27 |
| Elongation, 21 days (%) | | | | | | | 288 | 46 |
| Elongation, 28 days (%) | | | | | | | 248 | 15 |

*pph-parts by wt per hundred parts amine curative composition

EXAMPLE 1

This example shows the preparation of polyurethaneurea elastomers from various prepolymers and amine curatives and their properties. The prepolymer was heated and degassed. The amine curative was melted and added at 95% stoichiometry. The material was mixed and degassed. The mixture was poured into a 0.16 cm mold which had been preheated and plaques were post cured at the same temperature for 16 hr. The plaques were then placed in a constant temperature and humidity room for 2 weeks before testing. Table 1 shows the materials and amounts used and the properties of the resulting elastomers.
Glossary of Materials Used:
Versathane 2175 prepolymer—TDI polyether
Versathane 2180 prepolymer—TDI polyether
Airthane XCR-02DEV prepolymer—low monomer, low oligomer TDI polyether
MBOCA—methylene-bis-ortho-chloroaniline
MCDEA—4,4'-methylene-bis-(3-chloro-2,6-diethylaniline)

The data in the Table shows that Elastomers 5 and 6 which used an amine curative composition comprising an aromatic diamine and a di-(aminobenzoate) had surprisingly superior elongation than Elastomer 4. In addition, while Elastomers 7 and 8 also showed such superior elongation using an amine curative composition comprising an aromatic diamine, a di-(aminobenzoate) and a carboxylic acid and triethylenediamine, respectively, only Elastomer 7 retained this elongation upon humid aging.

STATEMENT OF INDUSTRIAL APPLICATION

The present invention provides an amine curative composition for curing polyurethane prepolymers to make conventional and rotational cast elastomers.

We claim:
1. In a method for the casting of a polyurethaneurea elastomer which comprises mixing a polyurethane prepolymer, an amine curative and optionally a polyol in a mixing head and depositing the mixture in a casting mold, the improvement which comprises employing an amine curative comprising:
   (a) 2–45 wt % aminobenzoate functionalized polyol having a functionality $\geq 1.9$ and a weight average molecular weight of 200–3,000,

(b) 55–98 wt % aromatic polyamine, and (c) 0.01 to <5 parts by wt carboxylic acid catalyst per hundred parts (a) and (b), the amine curative being at a temperature sufficient to melt the amines when mixed with the polyurethane prepolymer.

2. The method of claim 1 in which the aminobenzoate functionalized polyol is an aminobenzoate terminated polytetramethylene glycol (AB-PTMEG) of the structure

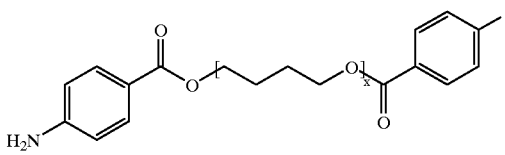

where X ranges from 3 to 50.

3. The method of claim 2 which the aminobenzoate terminated polytetramethylene glycol is based on a polytetramethylene glycol of number average molecular weight (Mn) 250, 650, 1000, 2000, 2900 or mixtures thereof.

4. The method of claim 1 in which the aromatic polyamine is methylenedianiline (MDA); 4,4'-methylene-bis-(3-chloro-2,6-diethylaniline) (MCDEA); diethyltoluenediamine (DETDA); 4,4'-methylene-bis-(2-ethyl-6-methylaniline) (NMMEA); 4,4'-methylene-bis-(2,6-diethylaniline) (MDEA); 4,4'-methylene-bis-(2-isopropyl-6-methylaniline) (MMIPA); 4,4'-bis(sec-butylamino)diphenylmethane; phenylenediamine; methylene-bis-orthochloroaniline (MBOCA); 4,4'-methylene-bis-(2-methylaniline) (MMA); 4,4'-methylene-bis-(2-chloro-6-ethylaniline) (MCEA); 1,2-bis(2-aminophenyl-thiol)ethane; N,N'-dialkyl-p-phenylenediamine; 4,4'-methylene-bis(2,6-diisopropylaniline) (MDIPA); dimethylthiotoluenediamine (DMTDA) or mixtures of two or more these aromatic polyamines.

5. The method of claim 1 in which the aromatic polyamine is MCDEA, MBOCA, DETDA, DMTDA or a mixture of two or more of these aromatic polyamines.

6. The method of claim 1 in which the aromatic polyamine is MCDEA.

7. The method of claim 1 in which the carboxylic acid catalyst is an organic carboxylic acid of 4 to 20 carbon atoms.

8. The method of claim 1 in which the carboxylic acid catalyst is an organic carboxylic acid of 6 to 12 carbon atoms.

9. The method of claim 1 in which the carboxylic acid catalyst is ethylhexanoic acid.

10. The method of claim 1 which comprises 0.05 to 1 parts by wt carboxylic acid catalyst per hundred parts (a) and (b).

11. In a method for the rotational casting of a polyurethane elastomer onto a rotating substrate which comprises mixing a polyurethane prepolymer, an amine curative and optionally a polyol in a mixing head and depositing the mixture onto the rotating substrate, the improvement which comprises employing an amine curative comprising:

(a) 2–45 wt % aminobenzoate fuctionalized polyol having a weight average molecular weight of 200–3,000, (b) 55–98 wt % aromatic polyamine, and (c) 0.01 to <5 parts by wt carboxylic acid catalyst per hundred parts (a) and (b), the amine curative being at a temperature sufficient to melt the amines when mixed with the polyurethane prepolymer.

12. The method of claim 11 in which the aminobenzoate functionalized polyol is an aminobenzoate terminated polytetramethylene glycol (AB-PTMEG) of the structure

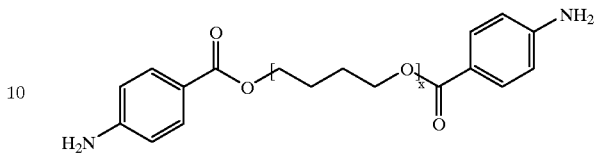

where X ranges from 3 to 50.

13. The method of claim 12 which the aminobenzoate terminated polytetramethylene glycol is based on a polytetramethylene glycol of number average molecular weight (Mn) 250, 650, 1000, 2000, 2900 or mixtures thereof.

14. The method of claim 11 in which the aromatic polyamine is methylenedianiline (MDA); 4,4'-methylene-bis-(3-chloro-2,6-diethylaniline) (MCDEA); diethyltoluenediamine (DETDA); 4,4'-methylene-bis-(2-ethyl-6-methylaniline) (NMMEA); 4,4'-methylene-bis-(2,6-diethylaniline) (MDEA); 4,4'-methylene-bis-(2-isopropyl-6-methylaniline) (MMIPA); 4,4'-bis(sec-butylamino)diphenylmethane; phenylenediamine; methylene-bis-orthochloroaniline (MBOCA); 4,4'-methylene-bis-(2-methylaniline) (MMA); 4,4'-methylene-bis-(2-chloro-6-ethylaniline) (MCEA); 1,2-bis(2-aminophenyl-thiol)ethane; N,N'-dialkyl-p-phenylenediamine; 4,4'-methylene-bis(2,6-diisopropylaniline) (MDIPA); dimethylthiotoluenediamine (DMTDA) or mixtures of two or more these aromatic polyamines.

15. The method of claim 12 in which the aromatic polyamine is MCDEA, MBOCA, DETDA, DMTDA or a mixture of two or more of these aromatic polyamines.

16. The method of claim 12 in which the aromatic polyamine is MCDEA.

17. The method of claim 12 in which the carboxylic acid catalyst is an organic carboxylic acid of 4 to 20 carbon atoms.

18. The method of claim 15 in which the carboxylic acid catalyst is an organic carboxylic acid of 6 to 12 carbon atoms.

19. The method of claim 16 in which the carboxylic acid catalyst is ethylhexanoic acid.

20. An amine curative composition for curing polyisocyanate prepolymers consisting essentially of (a) 2–45 wt % aminobenzoate functionalized polyol having weight average molecular weight of 200–3,000, (b) 55–98 wt % aromatic polyamine, and (c) 0.01 to <5 parts by wt carboxylic acid catalyst per hundred parts (a) and (b).

21. The method of claim 7 which comprises 0.05 to 1 parts by wt carboxylic acid per hundred parts (a) and (b).

22. The method of claim 11 which comprises 0.5 to 3 parts by wt carboxylic acid per hundred parts (a) and (b).

23. The method of claim 15 which comprises 0.5 to 3 parts by wt carboxylic acid per hundred parts (a) and (b).

* * * * *